A. W. ROCKWOOD.
LEATHER SCARFING MACHINE.
APPLICATION FILED MAR. 28, 1918.

1,362,964.

Patented Dec. 21, 1920.
6 SHEETS—SHEET 1.

Inventor:
A. Waldo Rockwood,
by James R. Hodder
Attorney.

A. W. ROCKWOOD.
LEATHER SCARFING MACHINE.
APPLICATION FILED MAR. 28, 1918.

1,362,964.

Patented Dec. 21, 1920.
6 SHEETS—SHEET 2.

Fig. 2.

Inventor:
A. Waldo Rockwood,
by James R. Hodder
Attorney.

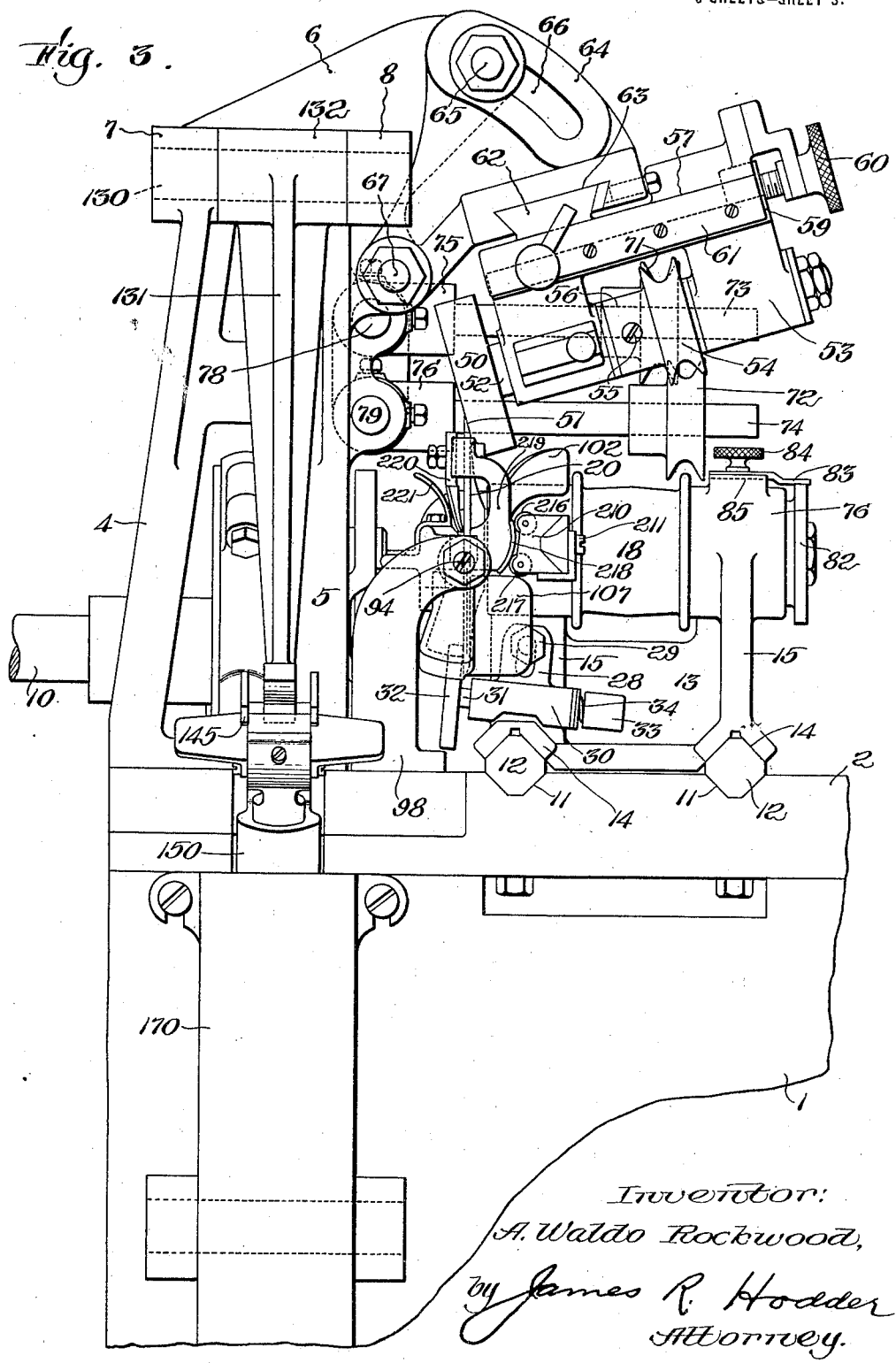

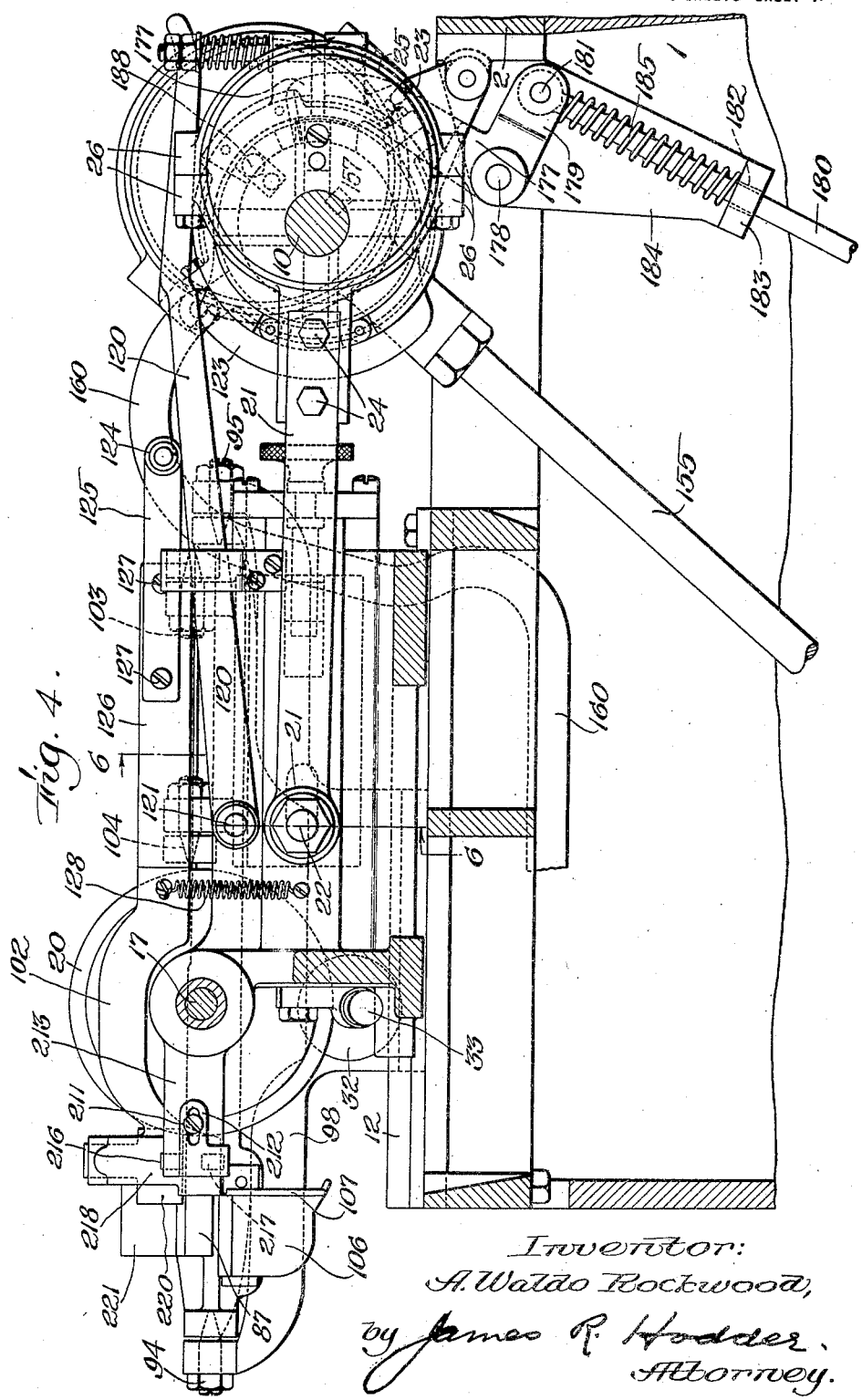

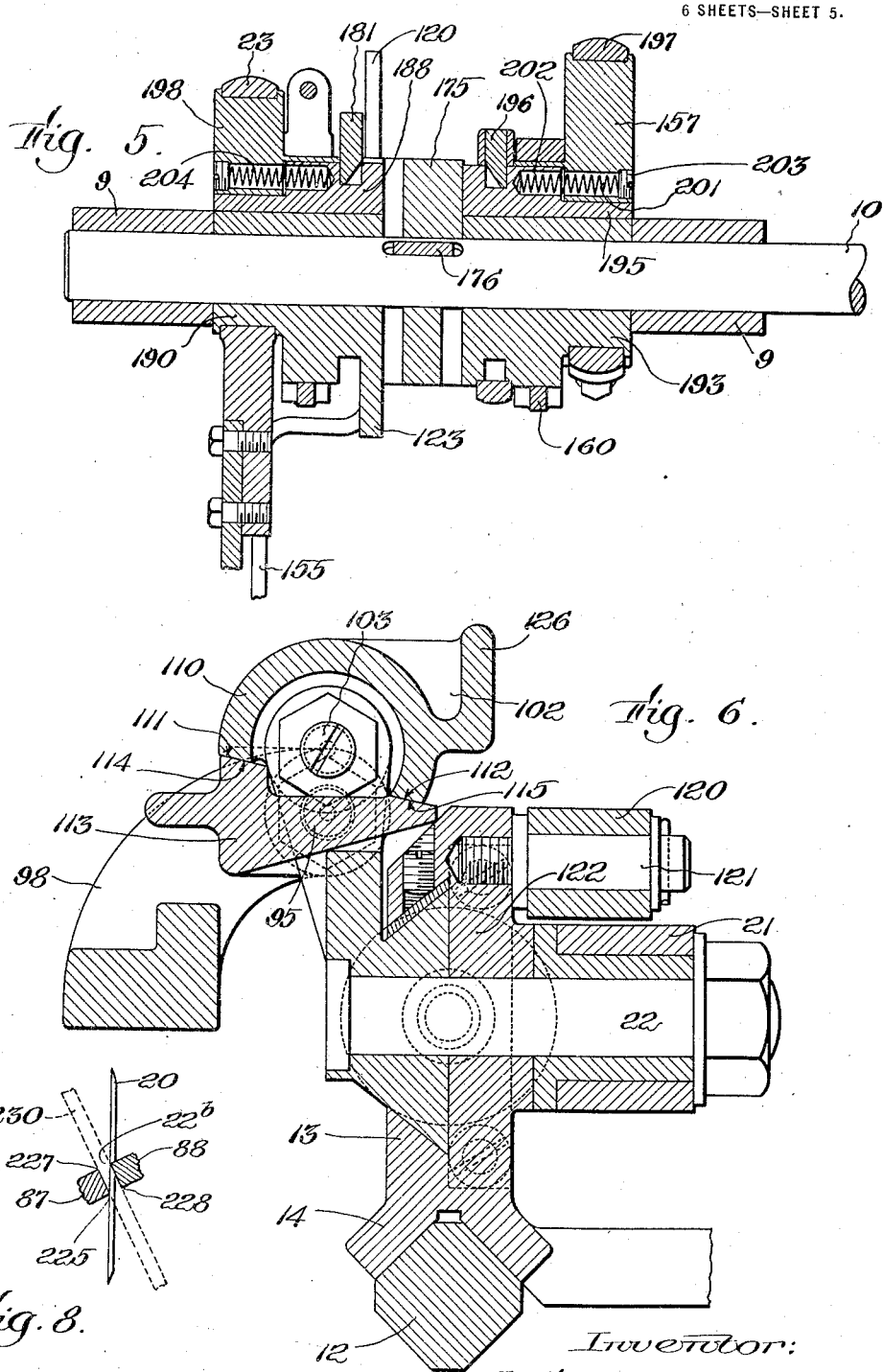

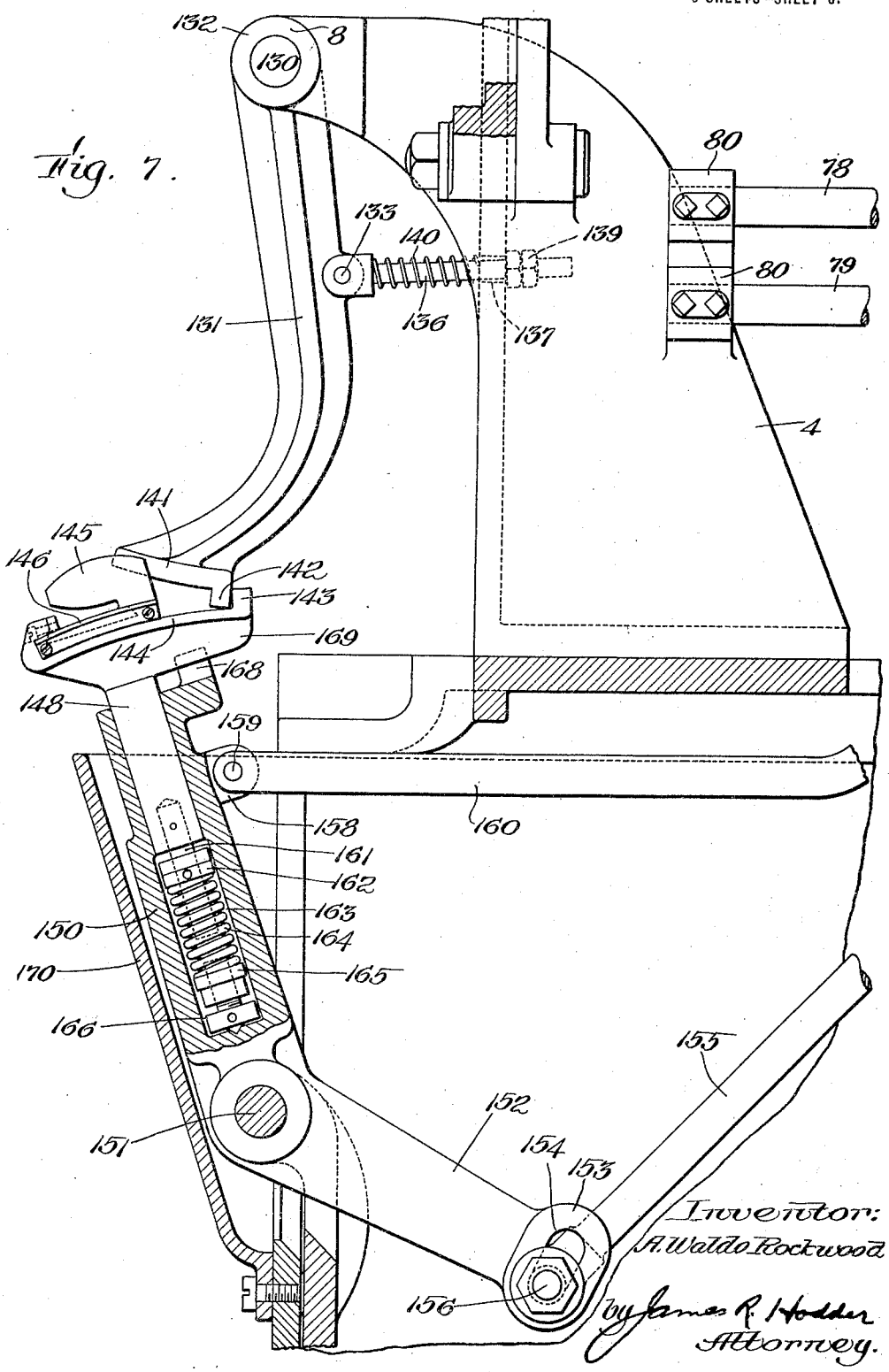

UNITED STATES PATENT OFFICE.

AARON WALDO ROCKWOOD, OF MILTON, MASSACHUSETTS.

LEATHER-SCARFING MACHINE.

1,362,964.     Specification of Letters Patent.     Patented Dec. 21, 1920.

Application filed March 28, 1918. Serial No. 225,350.

*To all whom it may concern:*

Be it known that I, AARON WALDO ROCKWOOD, a citizen of the United States, and resident of Milton, in the county of Norfolk and State of Massachusetts, have invented an Improvement in Leather-Scarfing Machines, of which the following description, in connection with the accompanying drawings, is a specification, like letters on the drawings representing like parts.

My present invention is a machine for severing a strip of material, by means of an inclined cut, and includes means for thus cutting two inclined surfaces, each being of the same length irrespective of varying thicknesses of the material cut and also includes mechanism for facilitating the cementing of the two scarfed ends and the joining of said two ends under pressure. The machine is especially valuable in the manufacture of continuous strips of stays or welting for use in the manufacture of boots and shoes, enabling the abutting ends of leather pieces to be cut, glued, united and completed by a suitable pressure, as substantially parts of a single operation. One of the most important features of the invention consists in the provision of automatic means which will accurately determine the length of the beveled or scarfing cut transversely across the material being operated upon, irrespective of the width of such material, so that a scarfed end across a strip of one thickness may be united to the scarfed end of any piece having a different thickness and yet enable both scarfed ends to accurately fit each other. This is of great importance in many lines of work, particularly in the making of continuous strips of welting, where a coil of the welt is applied to a shoe machine and fed continuously therefrom, it being necessary that the entire strip should be as even as is possible without objectionable projections, ridges, or the like. To this end I provide a pair of oscillating work-engaging members adapted to receive the strip of material to be scarfed between them and to automatically allow and compensate for material of varying thicknesses, which material, while thus held, is subjected to the scarfing knife, which cuts the strip transversely from one face of the work to the other while it is thus held. In order to provide a true, complete and perfect scarfing cut, I have devised a novel arrangement for mounting each of the pair of work-holding members so that they may oscillate upon centers in mechanically perfect and true alinement with the edge of the member along which the knife cuts. This particular feature is distinctly novel and enables the machine to operate upon any and all thicknesses of stock within a large range, positively cutting the ends, all with the same length of scarfed face, irrespective of the thickness of the stock. Consequently, even if a thin strip should be cut and cemented to a thicker strip, the length of scarfed face in each would be the same and the two strips would fit evenly at the scarfing joint. Also the machine will thus operate automatically on different thicknesses of material without alteration or adjustment. Heretofore in scarfing machines of this type, the work-engaging members were necessarily limited in their oscillating movement and not being pivoted on the true center or alinement with the ends of the work gages which coöperated with the trimming knife, their operation was faulty and the work unsatisfactory.

A further feature of the present machine consists in automatic means to operate the work-engaging and trimming members while the work is held stationary, relatively with the cutter, the forward movement of the cutter effecting the trimming while the stock is firmly held between the locking work-engaging members and immediately said members are actuated to release the pressure on the stock during the retraction of the cutter, thus preventing any marring, breaking or catching of the stock in the machine. In prior machines of this type the stock was usually arranged to move up to a cutter and through work-gages and then retracted therefrom, but the work-engaging members, while still in holding contact with the stock, would frequently roughen, damage or mar the surface of the stock, and therefore such prior machines were objectionable.

One advantage of particular value in my present machine is that the work-engaging members are so controlled as to rock or oscillate on their respective pivots in unison, *i. e.*, when one of said members is rocked to one side of the normal line, the opposite member is similarly rocked an equal extent from said normal line. This function of the machine is of importance in more accurately controlling the obliquity of the scarfing cut, and insuring a straighter and more even cutting, than has heretofore been possible. In old machines, the work-engaging members were rocked independently, simply through contact of the opposite sides of the strip being scarfed. If one side was hard, as in the case of the grain side of a leather strip, and the opposite the flesh side, the work gages would not oscillate equally, and the scarfing cut would vary accordingly.

Further features of the invention, details of construction, and novel combinations of parts will be hereinafter more fully pointed out and claimed.

Referring to the drawings illustrating a preferred embodiment of my invention,

Fig. 2 is a plan view;

Fig. 3 is a front view of the machine;

Fig. 4 is an enlarged side elevation partly in cross section of the pivoted work gages and adjacent portions;

Fig. 5 is an enlarged cross-sectional detail view of the clutch mechanism;

Fig. 6 is an enlarged cross-sectional view on the line 6—6 of Fig. 4;

Fig. 7 is an enlarged view, partly in cross section, of the pressing device.

Fig. 8 is a diagrammatic view partly in cross section illustrating the action of the cutting knife on the stock as held at an angular position by the work engaging portions or gages.

Figure 1:
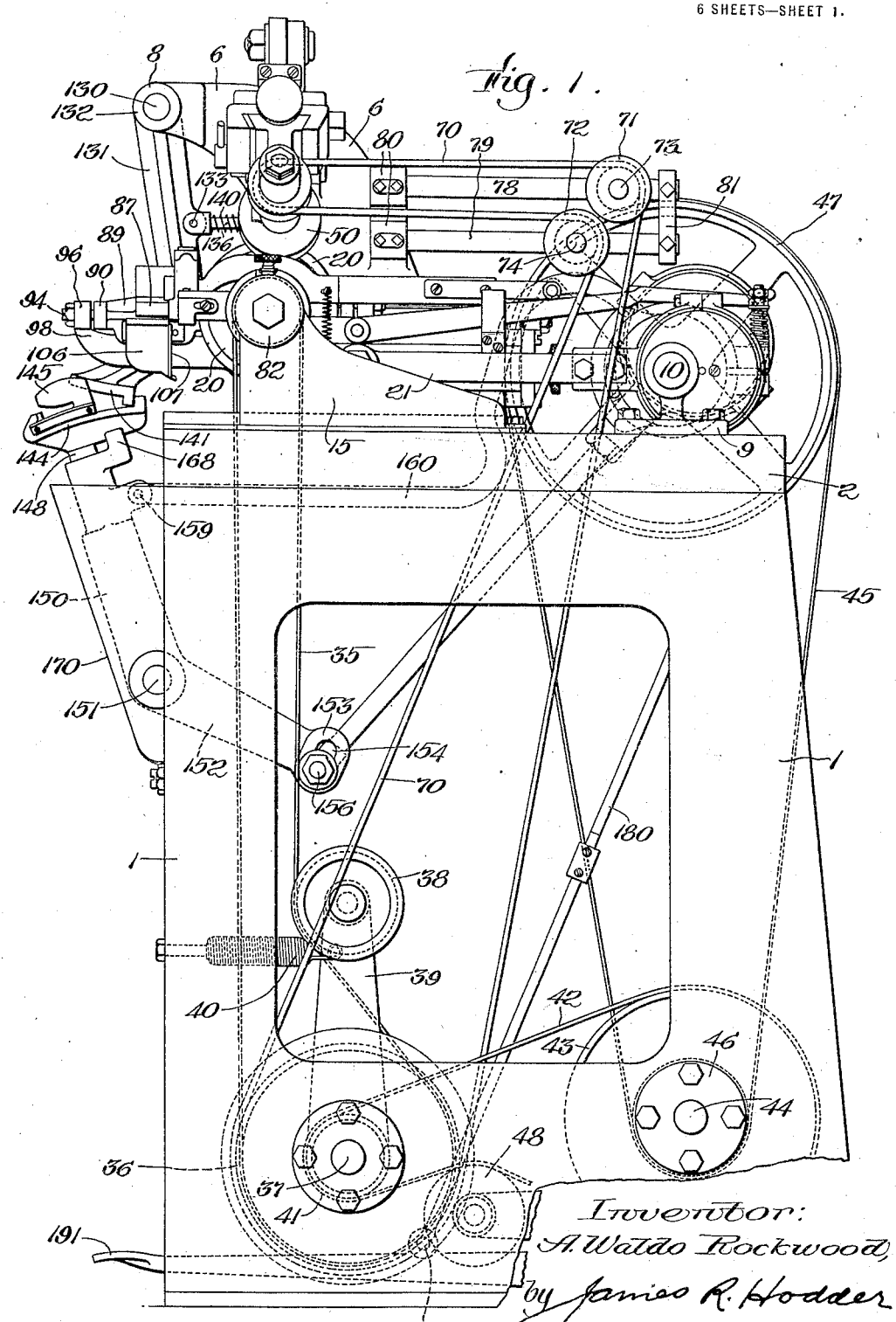
Figure 1 is a side view of my improved machine.

Referring to the drawings, the machine frame is designated generally at 1, having top plates 2, 2, and standards 4 and 5 extending upwardly at the left of the top 2, said standards being united in a projecting flange 6, and having lugs 7 and 8 extending forwardly to constitute bearings for the upper swinging arm, of a toggle arm. At the rear of the top 2 are brackets 9, 9, carrying suitable bearings for a power shaft 10, said shaft having the cams and clutches for the actuation of the machine. I have so designed my present machine as to have the scarfing mechanism at the right of the machine, viewing Fig. 3, and the compressing or toggle members to apply pressure on the scarfed ends when coated with glue and ready to be joined, at the left of the machine, so that the complete operation of trimming, and joining the scarfed ends of a leather strip may be performed in immediate sequence and substantially as parts of a single operation.

The leather scarfing device will be first described, and then the compression apparatus, which applies a predetermined pressure on the scarfing adjacent ends of the leather strips after same have been trimmed and coated with adhesive, the entire operation being the complete function of the machine, and by reason of the common power shaft and actuating devices, although the operations are controllable at will by the attendant.

On the top 2 are provided grooves 11, 11, in which slides 12, 12, are fitted, constituting slideways for a carrier 13 adapted to reciprocate to and fro on said slides 12. This carrier has correspondingly grooved members 14, 14, fitting on the guides 12, 12, being formed in the base of flanges 15, 15, giving suitable length to support the carrier and the mechanism carried thereby. Formed also on the flanges 15, 15, are hubs 16, carrying a shaft 17, extending through the bearings in the carrier, a pulley 18 secured to said shaft by a set screw 19 holding the shaft assembled between the bearings 16, which shaft carries the radial cutting knife 20. A link 21 pivoted to a stud 22 on the carrier 13, extends to an eccentric strap 23 on the shaft 10, bolts 24 holding said link and strap in assembled position. The strap 23 encircles an eccentric pulley 25 on the shaft 10, being in two parts, as usual, and joined by headed bolts through lugs 26, 26. The extent of the reciprocation of this carrier 13 and the cutting knife 20, as determined by the throw of its eccentric 25, is of sufficient extent to traverse the width of any strip intended to be scarfed or cut by the machine, the work being first clamped, and engaged by a pair of rocking work gages and the knife 20, which is under constant rotation at high speed, during the forward and back reciprocation of the carrier 13, is then moved to slice or scarf the strip from the edge of one work gage to the edge of the other, thus cutting the strip angularly as it is held between the parallel faces of said work gages. Secured to the carrier 13 by a slotted lug 28 and a bolt 29, is a socket member 30 carrying a shaft 31 having on its outer surface a wheel 32 adapted to be positioned to contact upon and rotate with the lower portion of the cutting knife 20, and hold the same from springing, steadying said knife during its cutting action. The wheel 32 is preferably held yieldingly in this contact, the head 33 and spring 34 bearing between said head and the socket member 30, as clearly shown in Fig. 3, effecting this yielding contact.

To rotate the cutting wheel 20 during its reciprocation on the carrier 13, a belt 35 is provided leading downwardly on a pulley 36 mounted on a shaft 37 near the base of the machine, leading said belt 35 over an idler 38, mounted at one end of an arm 39 and which arm is under the tension of a spring 40, normally rocking the arm against the belt 35 and thereby holding it under yielding tension during reciprocations of the carrier 13. The pulley 36 is keyed to the shaft 37, which shaft is rotated by the pulley 41 and belt 42 connecting it with the pulley 43 on the shaft 44. This shaft is belted by the engagement of the belt 45 with the pulley 46 on said shaft, and the pulley 47 on the shaft 10, said pulleys being of appropriate diameters to give a high speed to the cutter 20. A tension wheel 48, as shown at the lower part of the drawings, Fig. 1, holds the belt 42 under tension.

I find that it is desirable, in order to maintain the machine to its highest degree of efficiency, and to keep the rotating cutter 20 sharpened, to provide an automatic grinder which will maintain its position fixed to the frame of the machine and yet be in the paths of the forward and backward movements of the cutter 20, thus automatically sharpening the cutter 20, maintaining the desired bevel and edge thereon, each time a scarfing cut is made. To this end I mount a grinder 50 at an angle, preferably at the correct angle of bevel desired to form the cutting knife, as shown where said grinder and knife may come in contact at 51, Fig. 3. The shaft 52 carrying the grinder 50 is mounted in suitable bearings in a block 53, said shaft having secured thereon a pulley 54, held to the shaft by a set screw 55 in the hub 56 of said pulley, the entire block 53 being mounted for longitudinal adjustment in a slide 57, said block having a dovetailed portion 59 arranged for longitudinal movement in the slide 57 by adjustment of the thumb nut 60. A removable plate 61 on the slide holds the block 53 and slide in assembled position. The slide 57 has a dovetailed portion 62 projecting at right angles with the shaft 52 and the grinder knife and adapted to slide in a guideway 63 formed in a quadrant 64. This quadrant is adapted to be secured to the flange 6 of the upstanding frame by a headed bolt 65 passing through a slot 66 in said quadrant, the apex of said quadrant being pivoted at 67 to a bolt on the post 5, thus permitting angular adjustment relatively with the bolt 67 and the quadrant 64, giving the desired angle of adjustment for the grinder 50 with relation to the cutter wheel 20, manipulation of the thumb nut 60 affording a feeding movement for the grinder toward and from the cutter 20, the entire slide 57 being also capable of adjustment in the guideway 63 in the line parallel with the line of movement of the carrier 13 and said cutter. In order to rotate the grinder 50, a belt 70 is led around the pulley 54 and down to the pulley 36 on the shaft 37 at the base of the machine, this belt being led over guide pulleys 71 and 72, mounted on rods 73 and 74 respectively, extending from heads 75 and 76, which heads are in turn adjustably secured to rods 78 and 79 having their ends attached to the flange 6 at 80, 80. The member 81 connecting the outer ends of the rods 78 and 79 is provided to steady the same.

With the construction as thus described, power being applied to the shaft 10, the knife 20 is put under high speed and maintained at such speed during the reciprocations to and fro of the carrier 13 caused by the actuation of the link 21 and its corresponding eccentric on the shaft 10, the grinder 50 being also under high speed and in adjusted position where said grinder will effect a sharpening action on the knife 20 as the carrier 13 is reciprocated to and fro, bringing the knife and grinder into momentary contact at a point in the reciprocations of the carrier.

In order to hold the work, viz., the strip of leather or other material to be cut, beveled or scarfed at an angle, I provide a pair of work gages adapted to contact with each side of the strip to be cut, which work gages are spread apart or separated by said contact with the work to be beveled, and have pivotal mounting with the pivot for each work gage in exact alinement with the work engaging face or edge of its respective gage. These work gages also have their respective pivots mounted in exact alinement with the plane of the cutting edge of the rotary knife 20, so that said knife cuts, scarfs or slices the work from the edge of one work gage to the alternate edge of the opposite work gage, irrespective of the thickness of material held between said work gages and therefore irrespective of the angle or distance apart which the work may spread said gages as illustrated in Fig. 8.

In order to provide an accurate fine adjustment of the cutting edge of the knife 20 with said work gages, I apply a threaded adjusting screw 82 controlling the longitudinal position of the shaft 17, in its bearings on the carrier, rotation of the screw 82 effecting longitudinal adjustment of said shaft and of the edge of the knife 20. To hold the adjusting screw in position I provide the edge surface with notches and a member 83 secured by a thumb nut 84 to the adjacent bearing 16 tends to engage one of said notches and hold the screw 82 where adjusted. I prefer to fit the shank of the member 83 into a dovetailed slot 85 in the top of said bearing 16, although any other desired construction may be employed.

The work gages, as best seen in Fig. 2, consist in the work engaging portions 87 and 88, the member 87 being relatively long and mounted in an oscillating carrier 89, said carrier having flanges 90 and 91 at the respective ends of the carrier formed with tapered recesses 92 and 93 respectively, these recesses receiving the conical ends of pivot bolts 94 and 95, set through the arms 96 and 97 of a member 98 with its central portion fixed to the upright standard 5. Adjustment of the conical pivot members 94 and 95 provides any desired friction on the oscillation of the member 89, and these pivot points are in alinement with the cutting edge of the knife 20, being widely spaced apart and thereby affording accurate alinement in the rocking action of the gage 87 as its edge is moved away from the adjacent edge of the gage 88 by the thickness of the work. Also mounted in alinement with said pivot pins and the axis of oscillation of the carrier 89 are arranged similar conical pivotal construction at 100 and 101 for the oscillating carrier 102 having the coöperating work gage 88 at its forward end adjacent the gage 87. Said bearings for this oscillating carrier in lugs 103 and 104 are on a plate 105 secured to the carrier 13, and reciprocated to and fro by the operation of said carrier.

It will be noted that the work gages 88 and 87 are normally positioned, with the machine at rest and ready to receive work to be scarfed, as shown in Figs. 1 and 2, in contact, slightly in advance of the cutter 20. The work to be scarfed is applied across the projecting end of the long work gage 87 and overlapping the guide 106 with the edge against the flange 107 on said guide, and the machine is thereupon started by actuation of the foot treadle—as will be explained—and the carrier 13 with the shorter gage 88, and cutter 20, is moved forward, the gage 88 having a curved forward portion to ride upon and over the work, which is momentarily held by the operator as above described. This construction insures the holding and positioning of the work at the appropriate angle automatically depending upon the thickness of the stock, for the slicing or scarfing cutting action of the cutter 20 extending from edge to edge of the respective work gages, each work gage oscillating on its respective pivots in true alinement with the diameter of the cutter 20 and the edges of said gages, insuring an even and uniform length of scarf, irrespective of the thickness of the stock, the thinner the stock, the longer the length of scarf, and the thicker the stock the shorter the bevel or cut.

In order to insure that both the gages 87 and 88 and their respective rocking carriers will move in unison and in opposite directions to a substantially equal extent, I provide automatic means to compel these members to oscillate together. This feature is most important, although it is perfectly feasible to rely upon the stock itself to effect the respective oscillations of these rocking carriers and the work gages, but in case one surface of the stock is hard and glazed, and the other surface soft—such as in the grain and flesh sides of leather for welting, stays, etc., the gage in contact with the hard side would move one distance from center and the other gage in contact with the flesh side would move a less distance, thereby causing an unsatisfactory scarfing operation. My provision of automatic and positive means to have both gages oscillate in unison is, therefore, important and of value.

As best shown in Fig. 6, I secure to the oscillating carrier 102 near its rearward pivot, 103, a semicircular portion 110, extending around said pivot and having bearing faces 111 and 112. The oscillating carrier 89 has a corresponding projection 113, provided with bearing faces 114 and 115, coöperating with the said faces 111 and 112 respectively. These corresponding faces are beveled, and the oscillation of either the carrier 89 on its pivots or of the carrier 103 on its pivots, necessarily secures corresponding oscillation in extent and amount of the other member, said bearing faces 111 and 114 on one side of the pivots, and 112 and 115 on the other side of said pivots, resulting in this movement, said faces sliding upon each other with the transverse movement. As the carrier 89, is fixed, I therefore provide the bearing faces 114 and 115 of sufficient length to allow the shorter faces 111 and 112 on the carrier 102 room to slide thereover longitudinally during the reciprocation of the carrier 13, and during any transverse oscillation of said carriers on their pivots as above explained. This construction enables the accurate and even turning of the work gages 87 and 88, as already described.

I find it desirable to provide a release of pressure between the work gages 87 and 88 on the work during the retractive movement of the carrier 13 and consequently of the work gage 88, and its oscillating carrier 102. Without such provision the stock would be marred, injured and dragged backwardly with the rearward movement of the carrier after the scarfing action. To this end I provide a lever 120 secured to a stud 121 threaded into a tapped socket in the plate 122 which is fitted to the carrier 13 and carried thereby. This arm has a portion projecting beyond the cam shaft 10 and in position to be engaged by a cam 123 secured to said cam shaft and adapted to be raised by said cam at the instant of the completion of the forward movement of the reciprocating carrier 13 and consequently at the completion of the scarfing cut. This lever is in contact with a roll 124 attached to an arm or plate 125 secured to the flange 126 of the semicircular portion 110 by screws 127, 127, whereby a lifting of the lever 120 by the cam 123 oscillates the carrier 102, and correspondingly oscillates the carrier 89, thus instantly relieving the pressure on the stock held by the work gages 87 and 88 at the completion of the cutting action. A contractile spring 128 connects the carriers 102 and 98.

The operation of the machine as thus far described, comprises the scarfing mechanism, and the actuation of the various instrumentalities to effect this movement, are preferably secured by the actuation of the clutch and members carried thereby, on the continuously rotating shaft 10. The cams are appropriately timed for the respective operations of their several movements during the cycle of operations of the machine. This clutch is shown in detail in Fig. 5 and as the same includes the actuation of the toggle mechanism for pressing the scarfed ends of work after they have been coated with adhesive the operation of the toggle mechanism will be now described.

As shown in enlarged detail in Fig. 7, the journal bearings 7 and 8 carry a pivot pin 130, which supports the toggle member 131 passing through an appropriate socket in the hub 132 of said member. Pivoted to the side of the toggle member at 133 is a stem 136 extending through an enlarged hole 137 in the cross bracket 138 uniting the uprights 4 and 5, with its outer end threaded to receive lock nuts 139, limiting the outward swinging movement of said lever 131, a coiled spring 140 permitting the inward swinging movement of said lever, automatically swinging it outwardly again to normal position. The foot of the lever 131 is formed with a presser 141, having a rearward flange 142 adapted to fit within an upstanding flange 143 on the lower presser foot 144. This lower presser foot has a pair of guides 145, 145, spaced to receive the foot 141 of the upper lever, and contain a plate 146 on which the work is led. Normally both toggle members are moved to outward position so that the presser member 141 and the plate 146 are spaced, as shown in Fig. 7, the operator sliding the work under the guides 145, holding the same outside said guides, which are also guards, to prevent injury to the operator, and thereupon the toggle members are rocked inwardly and the pressure on the work completed and held, and thereupon the members are automatically moved outwardly and the work released, being removed and the mechanism ready for a succeeding operation. In order to effect this action and also to provide a yielding pressure on the work to give uniform compression thereto, I provide a lower member 144 with a stem 148, fitting within a corresponding socket therefor in the lower toggle member 150, said member being pivoted at 151 and with its other arm 152 formed with a socket 153 having an enlarged slot 154 therein and united to a rod 155 by a headed bolt 156 having its shank engaging said socket and permitting a predetermined amount of lost motion or play therein. The rod 155 extends upwardly to an eccentric strap 157 on the cam shaft. On the part 150 of the lower toggle arm are formed lugs 158, to which is pivoted at 159 a rod 160, extending from said arm in a curved manner, to a clutch on the cam shaft 10, so that the forward or inward movement of said rod 160 will automatically actuate the clutch to give a single rotative movement to the cam 157 and consequently a reciprocating movement of the rod 150 and an inward and outward oscillation to the toggle members. In order to provide a suitable yielding tension on the presser members the shaft 148 has a short extension 161, to which is secured a collar 162 of less diameter than the enlarged recess 163 within the arm 150, a coiled spring 164 bearing between the collar 162 and an adjustable nut 165 threaded onto the stem 166 resting in the bottom of the socket 164. This construction permits an inward yield to the shaft 148 and lower presser member, said spring normally restoring the presser member 144 to its outward position as shown in Fig. 7, guides 168 formed on top of the arm 150 spanning the flange 169 and permitting this yielding action while maintaining the lower presser 144 in alinement.

In operation of this presser mechanism, the attendant having scarfed two ends of stock to be joined, coats them with adhesive,—as by momentarily applying same to a roll feeding adhesive within convenient reach,—joins the scarfed ends, fits the same under the guides 145, with the hands holding the stock resting on the portions of the lower presser member at either side of said guides 145 and clear of danger of contact with the upper presser 141, then giving a slight inward movement to the toggles, permitted by the length of the slot 154. This inward movement is easily accomplished by the operator, and simultaneously moves the rod 160 inwardly and actuates the clutch to impart rotative movement to the cam 157 and consequently to actuate the rod 155 which first moves downwardly, rocking the arms 152 and 150 of the lower toggle member on the pivot 151, and as the guides 145 have contacted with the flange 142 on the upper toggle member during the preliminary inward movement of the toggle by the operator, the actuation of said rod 155 completes the inward movement of both toggle members, thus effecting a compression of the scarfed joint under the foot 141 forcing the lower member downwardly against the tension of the spring 164 and a completion of the rotative movement of the cam then throwing the toggle members outwardly, the spring 140 aiding in completing the forward throw of the upper member and the disconnection of the clutch completing the forward outward movement of the lower toggle member through the action of the rod 160. A guide 170 is secured to the frame to guard the lower toggle member as also illustrated in Fig. 7.

The clutch mechanism is clearly illustrated in Fig. 5, showing a cross-sectional view through the center of the clutch and cam devices, looking in the direction of the arrow on Fig. 2. It will be appreciated that any suitable or desirable clutch mechanism may be utilized, that herein shown being for convenience and illustrative purposes only and constituting a preferred form. The shaft 10 is normally under constant rotation. The several cams mounted on said shaft between the bearings 9, 9, are normally at rest excepting the intermediate pulley 175, which is secured to said shaft by the key 176. The latch 177 is in the form of a bellcrank lever pivoted at 178 to a stud on the machine frame, and with its other arm 179 pivoted to a rod 180 at 181, said rod passing through an enlarged recess 182, in a flange 183 on the plate 184 extending from the top 2. A spring 185 bearing between the flange 183 and the short arm 179, automatically acts to return the latch arm 177 into position and hold the same to disconnect the pulley 175 after the completion of one revolution. The latch 177 has a wedge face 187, normally holding the plunger 188 free of engagement with any one of several notches 189 in the side of the pulley 175, said plunger being carried by the cam wheel 190 in a longitudinal recess therein, and as soon as the latch 177 is removed by the drawing downwardly of the rod 180 through application of the operator's foot on the treadle 191, to which the rod 180 is connected at 192 (see Fig. 1), the latch engages one of the notches 189—of which there are preferably at least three—in the side of the pulley, and the entire cam wheel 190 is given a single rotation, the plunger 188 being disconnected at the completion of the revolution by being withdrawn against the wedge face of the latch 177 which meanwhile has been returned to position by the action of the spring 185. During this rotation the carrier 13 has been moved forwardly and backwardly, by the link 21, strap 23 and the eccentric 198, to make the cut, pass the cutter 20 across the grinder 50 and the oscillating carriers 98 and 102 have been spread apart by the action of the cam 123 and lever 120 during the retractive movement of the carrier, as already explained, whereupon the cam wheel 190 being disconnected comes to rest.

A similar arrangement of clutch and plunger is provided for the cam wheel 193 controlling the action of the toggle members and press. In this side of the pulley 175 are a similar plurality of clutches 194 adapted to receive a spring pressed bolt 195 when the latch 196 is moved by the rod 160, which movement is effected by the preliminary inward swinging of the two toggle members when the operator starts said members inwardly. The bolt 195 being released is allowed to connect the wheel 193 with the pulley 175, being again disconnected at the completion of a single revolution. This revolution moves the toggle members inwardly and outwardly by the rod 155, eccentric 157 and strap 197 encircling the eccentric, whereupon the cam wheel 193 is disconnected by withdrawal of the bolt 195 on again striking the wedge surface of the latch 196. A coiled spring 201 housed in an aperture bored through the cam wheel 157, and bearing in a bored recess 202 in the sliding member 195, a threaded nut 203 constituting a tension member for said spring and holding the spring in said recesses is fitted into a correspondingly threaded end of said aperture. A similar arrangement for the member 199 is provided by the coiled spring 204 in the wheel 23.

In order to prevent the short and sliding work gage 88 from "springing" because of the distance of said work gage from the pivot points 103 and 104, I provide a bearing for same, consisting in a plate 210, adjustably secured by a bolt 211 to an elongated slot in the flange 212 of said plate, the bolt being set into a tapped recess in the arm 213 extending from the bearing 215 for the shaft 17 of the cutter 20, the pair of rollers 216 and 217 are carried by this plate 210 in contact with a semicircular strip 218, attached to the forward part 219 of the oscillating lever 102 carrying the work gage 88 and opposite said work gage. This construction enables the work gage 88 to maintain its alinement while being rocked, the semicircular bearing 218 being upon the arc of a circle with the fixed edge or corner of the gage 88 as its center. I also prefer to utilize this forward part 219 of the oscillating lever 102, to carry an upper guide for the work shown as a plate 220 (Fig. 3), this plate coöperating with a corresponding plate 221 secured to the lower oscillating lever 98. These upper guide plates 220 and 221 are preferably of springlike metal, and engage the upper part of the leather stock during the scarfing operation in a similar manner to the lower work support 106 and its flange 107, as already explained.

From the foregoing description the operation of the machine will be easily followed. The gages 88 and 87 are usually provided with a sufficient length from the respective fixed corners (see Fig. 8), at 225 and 226 respectively, to the free or moving corners 227 and 228 respectively, with the width of three quarters of an inch, this being the standard length of scarf usually desired. Should the scarfing cut of an inch of width be required, these gages should be made of an inch in width or for any other length. With the machine in operation, and with the cutter and movable work gage in retracted position, as shown in the drawings, the attendant holding the strip to be scarfed, lays it across the top layer of the work rest 221 and the bottom work support 106 with the inner edge against the flange 107 and then presses the foot treadle 191. This releases the clutch for the driving mechanism on the left as shown in Fig. 5, allowing the carriage 13 to be moved forwardly, carrying the cutter 20—which has been set with its edge immediately back of the work gage 88—and said movable work gage forwardly, sliding the same over the work gage 87 until contacting with the work, when said gages oscillate for the thickness of the work, holding it firmly between them as shown in Fig. 8, with the stock 230 crossing the path of the cutter 20 from the fixed edge 226 of the work gage 88, to the alternate fixed edge 225 of the work gage 87, this producing the slicing or scarfing cut. As soon as this is accomplished, the gages are separated through the lifting of the roll 124, by the lever 120, thus releasing the work from said gages while the shorter gage 88 on the carrier 13 is retracted. This prevents any ruffling, marring or dragging of the scarfed and thin edged cut portions of the stock backwardly into the machine. As the clutch effecting this operation moves only once, the machine automatically stops when the carrier 13 is retracted. The operator now coats any two scarfed edges with adhesive, applies them together, and the length of scarf will be the same, irrespective of the thicknesses of the scarfed ends, thus making an even surface when joined. To complete the joining, they are fitted under the guides 145 and a slight inward movement is given to the lower toggle 148, this effecting the power actuation of the press or toggle members inwardly and outwardly as already explained, when these members are at rest after a single connection. The work is then removed and another end scarfed. In the manufacture of continuous lines of welting, the machine is most important, as the operator or attendant is obliged to splice together all sorts and kinds of welting of different thickness and can cut out by the scarfing action, a bad or imperfect piece or section in a strip, scarfing the strip at either end of the imperfect section and cementing and uniting it again, so that a specially even and perfect roll of welting made up of a great many short pieces of leather can be made.

My invention is further described and defined in the form of claims as follows:

1. In a machine of the class described, the combination of a pair of pivoted work-engaging members having means to oscillate each member about a line coinciding with a work-engaging edge of each member.

2. In a machine of the class described, the combination of a pair of pivoted work-engaging members having means to oscillate each member about a line coinciding with a work-engaging edge of each member, and automatic means to control the oscillation of both members in synchronism.

3. In a machine of the class described, a pair of pivoted work-engaging members, said members being adapted to hold work between their faces, a cutter coöperating therewith and arranged to make an oblique cut on the stock from one edge of one of said members to the opposite edge of the other member, and means to rock said members on opposite axes, exactly coincident with the respective edges adjacent the cutter.

4. In a scarfing machine, means to receive and hold work of varying thicknesses, comprising a pair of pivoted work-engaging members, said members having their respective pivots in alinement with the work engaging edge of each member, a cutter and means to advance said cutter toward and from the work.

5. In a scarfing machine, means to receive and hold work of varying thicknesses, comprising a pair of pivoted work-engaging members, said members having their respective pivots in alinement with the work engaging edge of each member, a cutter and means to advance said cutter toward and from the work, in combination with means automatically controlled by the thickness of the work to produce the same length of scarfed cut on stock of varying thicknesses.

6. In a scarfing machine, a rotary cutter, a pair of pivoted work engaging members, means for relative movement of said cutter and said members, each of said work-engaging members being pivoted in alinement with a work engaging edge of each member, and automatic means to effect coöperation between the work engaging members and the cutter to produce a scarfing cut on the work, while held stationary by said work-engaging members, constructed and arranged to automatically compensate for material of varying thicknesses, while forming a scarfing cut of substantially equal length on said varying material.

7. In a scarfing machine of the kind described, means to receive and hold work of varying thicknesses, comprising a pair of pivoted work engaging members, one of said members being adapted to oscillate on fixed pivots, and the coöperating member being adapted to slide upon said first member while oscillating on its pivots, and means to cut the stock while held by said work gages.

8. In a scarfing machine of the kind described, means to receive and hold work of varying thicknesses, comprising a pair of pivoted work engaging members, one of said members being adapted to oscillate upon a pair of pivotal points in alinement with one corner of the work gage, and the other work gage being adapted to oscillate upon pivots in alinement with the alternate corner of said other work gage.

9. In a scarfing machine of the kind described, means to receive and hold work of varying thicknesses, comprising a pair of pivoted work engaging members, one of said members being adapted to oscillate upon a pair of pivotal points in alinement with one corner of the work gage, and the other work gage being adapted to oscillate upon pivots in alinement with the alternate corner of said other work gage, and means for the relative sliding movement of one work gage longitudinally of the other during said oscillation.

10. In a machine of the class described, a pair of pivoted work engaging members, each member having a work engaging face and pivots in alinement with a corner of said work engaging face, means permitting the thickness of the work to separate said faces, and automatic mechanism to control the oscillation of both work gages together from alternate corners of said work engaging faces.

11. In a machine of the class described adapted to hold and scarf work, the combination with a pair of pivoted work engaging members, having a pivotal support in alinement with the work engaging faces, of means to separate said faces and oscillate said members on their respective pivots during the work holding and scarfing operations, together with automatic means to move said members on their pivots to release the work immediately upon the completion of the scarfing action.

12. In a machine of the class described adapted to hold and scarf work, means to receive and hold work of varying thicknesses, comprising a pair of pivoted work engaging members, one of said members being arranged for longitudinal sliding action on the other, means to oscillate said members in synchronism by engaging and holding the work during the scarfing operation, and means to release the work from said holding engagement after the scarfing cut has been made and during the retraction of said movable member.

In testimony whereof I have signed my name to this specification, in the presence of two subscribing witnesses.

A. WALDO ROCKWOOD.

Witnesses:
JAMES R. HODDER,
HAROLD J. CLARK.